Dec. 15, 1942.   J. M. CROM   2,305,239
APPARATUS FOR COATING PASSAGES
Original Filed April 26, 1934    3 Sheets-Sheet 1
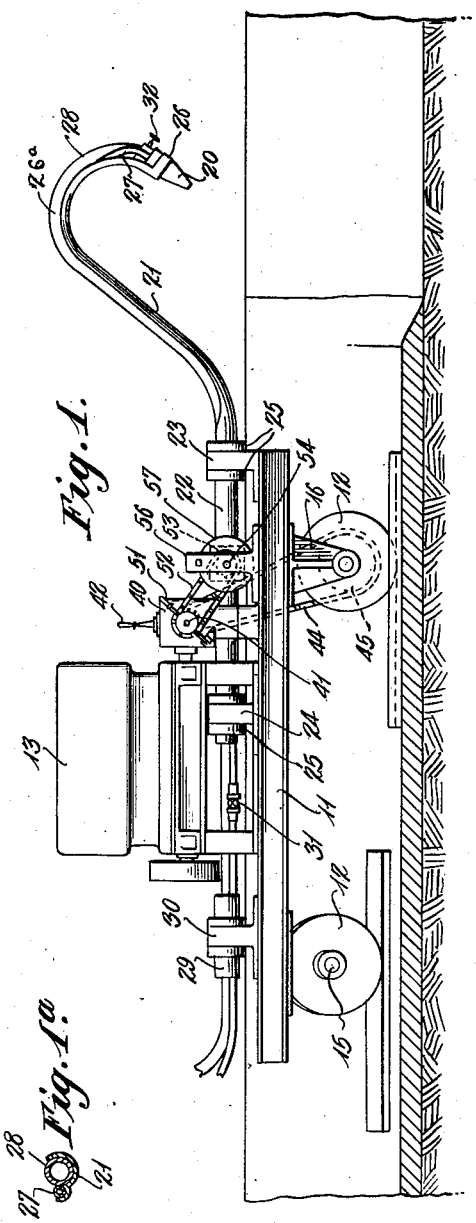
Inventor
John M. Crom
By Stevens and Davis
Attorneys

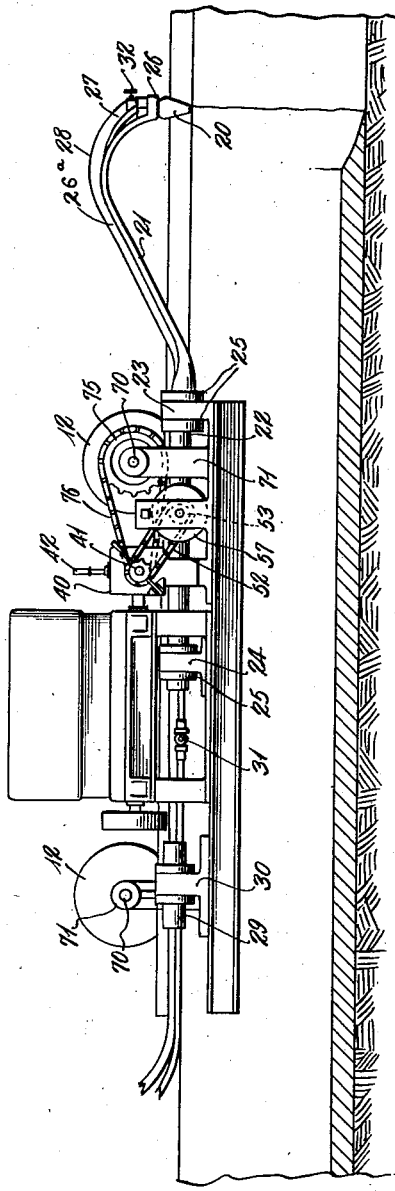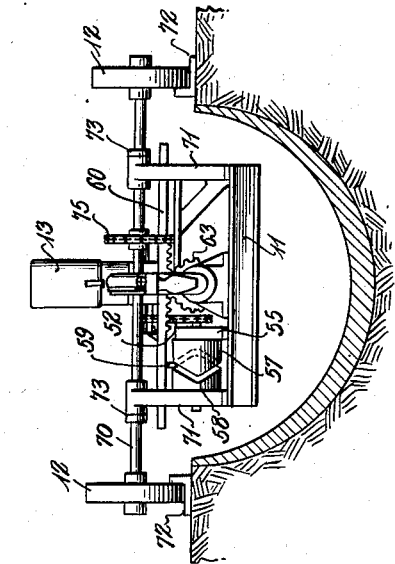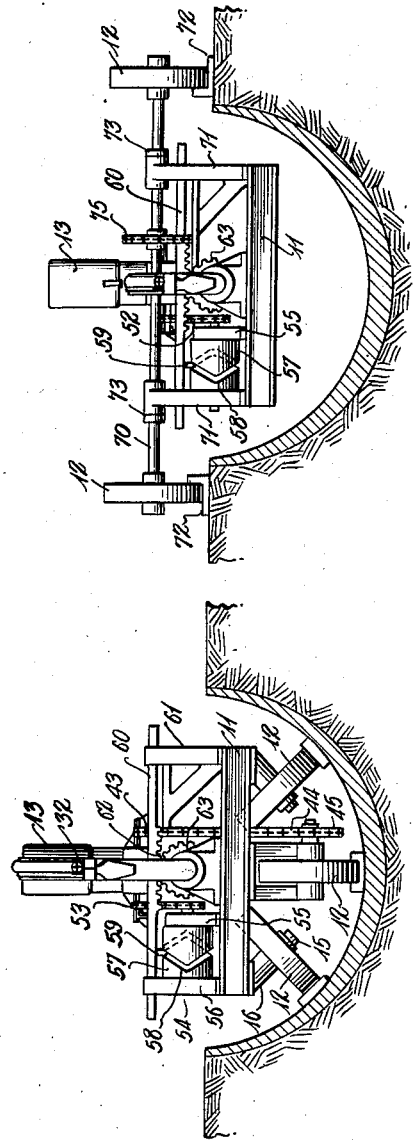

Dec. 15, 1942.  J. M. CROM  2,305,239
APPARATUS FOR COATING PASSAGES
Original Filed April 26, 1934  3 Sheets-Sheet 3
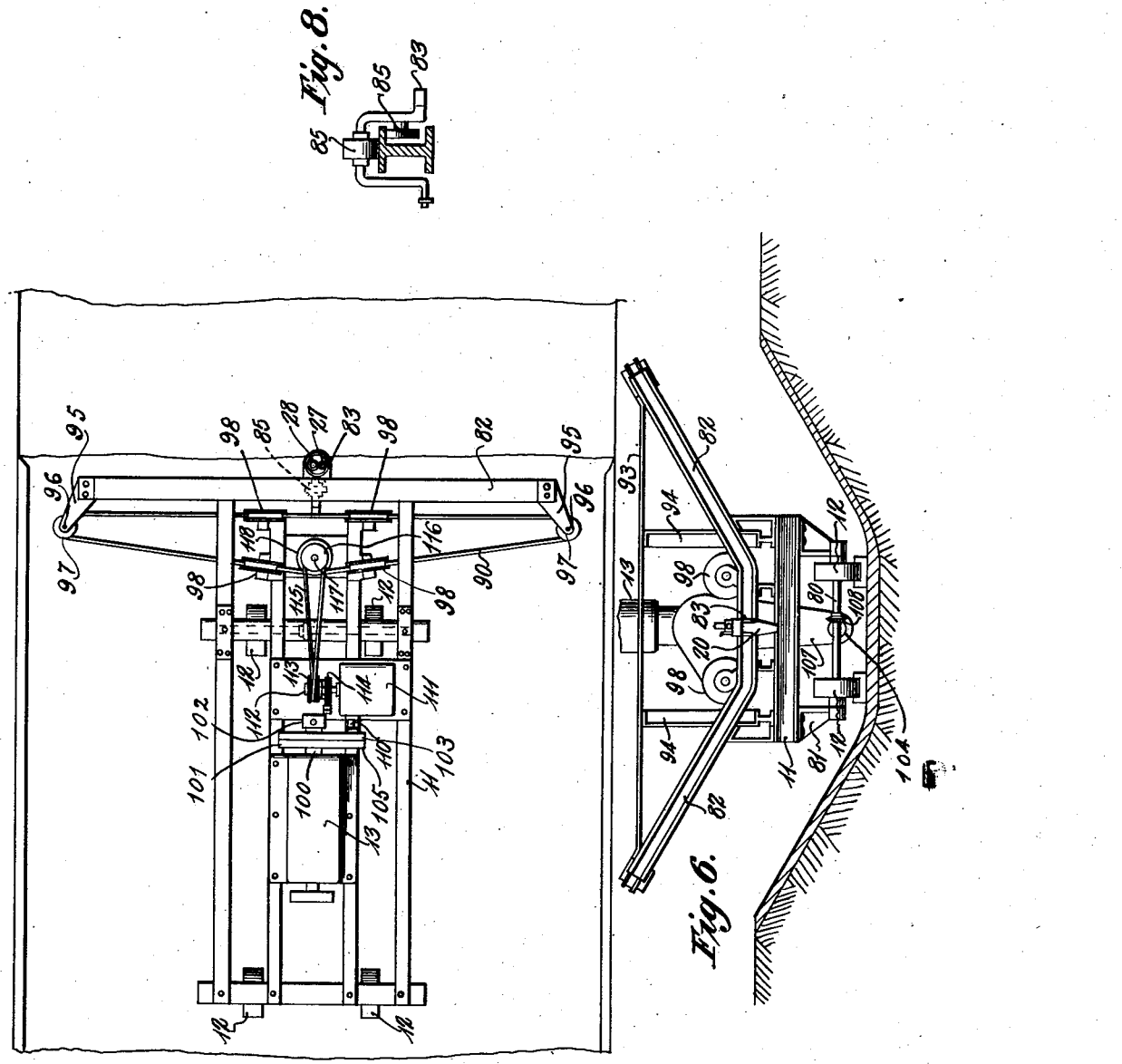
Inventor
John M. Crom
By Stevens and Davis
Attorneys Patented Dec. 15, 1942

2,305,239

UNITED STATES PATENT OFFICE 2,305,239

APPARATUS FOR COATING PASSAGES

John M. Crom, New York, N. Y.

Original application April 26, 1934, Serial No. 722,585. Divided and this application October 24, 1939, Serial No. 301,077

4 Claims. (Cl. 91—44)

This invention relates specifically to a new machine for applying pneumatically projected mortar to the surface of a ditch. It involves, however, a new form of coating for passages in general, ditches, tunnels and the like, and a method of forming such coatings. Also, although specifically applicable to the formation of mortar or cement coatings, the principles of this invention may be advantageously applied to the formation of coatings of other materials, such, for example, as plaster, asphalt, waxes, resins, gums, or the like.

Prior to this invention, mortar coatings were applied by hand, that is, by the use of a pneumatic projecting device generally known as a gunite or cement gun manually directed onto the surface to be covered. Even in coating small objects, hand operation of the projecting nozzle produces some unevenness of the coating and requires the application of a considerable excess of the coating material to assure thorough coverage. In coating large objects such as a ditch or a tunnel this unevenness and waste is greatly increased. Also, due to the uneven application, sand, which is intermixed with cement and water to form the mortar, accumulates in small piles and a tendency to cause sand pockets and flaws in the coating is the result. These are particularly undesirable when water is to flow through the coated passage, as they retard the flow and allow water to seep out and undermine the structure.

To overcome these difficulties and produce a lining that is smooth, even and free from flaws and sand pockets, the present invention has been devised. Further, this invention provides means for the economical lining of ditches, saving both labor and material. It also permits the coating to be applied thicker at one or more longitudinal sections where the strain or wear is to be greatest, usually at the bottom of the ditch.

In general, the new apparatus comprises a machine that travels along the ditch and carries upon an extending arm the nozzle of a pneumatic mortar projecting device. Driven by the same means that drives the machine along the ditch is a cam or equivalent device serving to oscillate the nozzle carrying arm. This oscillation is such that the mortar is applied in adjacent, partially overlapping strips each of which extends transversely of the ditch. By properly shaping the cam, the nozzle of the projecting device may be made to move less rapidly over one or more longitudinal sections of the passage thus applying to those sections a somewhat thicker coating. In coating ditches it has been found advantageous to make the coating thickest at the bottom of the ditch and gradually decreasing in thickness toward the edges.

To illustrate this invention three forms of machines for coating ditches are shown in the drawings and will be described in detail. It will be understood, however, that other forms may be used within the broad scope of this invention and that the new method of coating and the new form of coating are not limited to any specific form of machine. In the drawings:

Figure 1 is a side elevation of a machine for applying a coating to ditches in accordance with the present invention, a part of the ditch being removed to expose the machine to view;

Figure 1A is a detail of Figure 1 taken line A—A;

Figure 2 is a plan view of the same machine;

Figure 3 is an end elevation of the same machine;

Figure 4 is a side elevation of a modified form of ditch coating machine in which the carriage is supported on wheels which are outside of the ditch. Part of the machine and part of the ditch is removed to show the working parts of the machine;

Figure 5 is an end elevation of the machine of Figure 4;

Figure 6 is an end elevation of a machine for coating ditches which are wide and flat instead of semicircular;

Figure 7 is a plan view of the machine of Figure 6;

Figure 8 is a detail view of part of the machine in Figure 6 showing the support for the nozzle arm.

The machines shown are all for use in the coating of ditches but by modification they can be adapted to the coating of other passages such as tunnels. When such modifications are made, the movement of the arm and nozzle may, if desired, be made rotary instead of oscillating, as is necessary in the coating of ditches.

Each of the machines illustrated comprises a frame 11, supported upon wheels 12 and carrying a driving motor 13. The motor is shown as an internal combustion engine but may be an electric motor, a compressed air motor or any other device that will supply the necessary operating power for the machine.

In the machine shown in Figures 1, 2 and 3 the wheels 12 are three in number and each is mounted on a short shaft 15 secured in a bracket 16 on the underside of the frame. One of the wheels is located in the middle of the machine at the end adjacent the nozzle support and the other two wheels are at the other end of the frame and are mounted to slant outwardly and engage the side walls of the ditch or boards laid thereon. Boards may also be placed on the bottom of the ditch to support the first mentioned wheel. Usually the machine is supported upon the coated portion of the ditch but it may precede the coating nozzle instead of following it through the ditch in which case it will rest upon the uncoated ditch. The mountings for the wheels are made adjustable where the machine is to be used in ditches of various sizes so that they may be adjusted for use according to the size and shape of the ditch.

The nozzle 20 of a pneumatic mortar projector is supported at the end of an arm 21 adjustably fixed to a tubular member 22 that extends axially of the ditch and is mounted in bearings 23 and 24 upon the frame, in which it is free to rotate or oscillate. Collars 25 prevent the member from moving axially in the bearings. Preferably the nozzle 20 is supported merely by being removably received in a fork 26 formed at the end of the arm to receive it. The arm is formed in two sections pivoted together at 26a so that they may be moved relative to each other to adjust the direction of the nozzle. Connected to the nozzle are water and material supply tubes 27 and 28 respectively. These tubes, which are usually flexible hose, lie side by side on the extending portion of the arm 21 which is shaped to receive and hold them as shown in Figure 1A; pass through the tubular member 22; and also through an additional supporting sleeve 29 mounted in a bearing 30 at the rear of the machine.

The amount of water introduced into the material at the nozzle may be adjusted either under the motor at a valve 31 or at the nozzle itself by a valve 32. The last mentioned valve and the fork mounting for the nozzle are provided so that the nozzle may be taken from the machine and used by hand, if desired, for example on the edges of the ditch.

To connect the motor so that it will oscillate the arm 21 and at the same time move the whole machine along the ditch, a gear box 40 is mounted on the frame at the end of the motor 13. From this gear box the ends of a cross shaft 41 extend, the cross shaft being driven from the motor shaft when the gears of the gear box are in mesh. The meshing of the gears in the box is controlled by a gear shifting lever 42 on the top of the gear box 40. On one end of the cross shaft 41 is a sprocket 43 carrying a chain or link belt 44 connecting it with a similar sprocket 45 fixed non-rotatably to the short shaft 15 to which the forward wheel 12 of the machine is also non-rotatably fastened. Thus the motor is connected to move the machine along the ditch.

The nozzle arm is, in the illustrated machine, oscillated by power taken from the other end of the cross shaft 41. On this end the cross shaft carried a freely rotatable sprocket 50, and a clutch 51, for clutching it to the shaft. A chain or link belt 52, connects the sprocket 50 to another sprocket 53 fixed to a shaft 54 held rotatably in brackets 55 and 56 on the frame. Between the brackets the shaft 54 carries a cylindrical cam 57 having a surface track 58 in which a follower 59 is positioned. Supporting the follower 59 and moved laterally thereby as the cam rotates is a rack bar 60, slidably mounted in an opening in the bracket 56 that supports one end of the cam shaft and in a similar opening in a similar bracket 61 on the other side of the machine. The teeth 62 of the rack bar are positioned over the hollow portion of the nozzle supporting arm 21 and mesh with a spur gear 63 rigidly mounted thereon. Thus as the cam 57 is revolved the rack is moved back and forth to oscillate the nozzle arm. The angle through which the arm oscillates and the relative speed of the arm at different times during the oscillation may be accurately determined by the shape of the cam. Means additional to mechanism described may be provided to permit the rate of movement of the carriage to be changed to adjust the thickness of the coating without changing the rate of oscillation of the nozzle.

It will be noted from the drawing that the nozzle is held somewhat above the axis of rotation and is slanted back towards the machine. Somewhat better results may be obtained by so locating and directing the nozzle under certain conditions. Particularly, when the ditch is small, that is under forty-two inches in radius, it is desirable to have the nozzle above the axis of rotation so that it will not be too close to the surface being coated. The slanting of the nozzle towards the already coated section of the ditch throws any loose sand back upon the finished ditch where it does no harm, and seems to compact the coating and make it more uniform. However, either or both of these features may be omitted as has been done in the machine of Figures 4 and 5.

Essentially, this latter machine does not differ from the one already described, but is merely a modified construction in which the nozzle is located substantially on the axis of rotation and directed perpendicularly to the surface of the ditch and in which the supporting wheels are so placed that they rest on the ground at the sides of the ditch instead of on the ditch surface.

To place the wheels outside the ditch they are increased to four in number and mounted in pairs on axles 70, spanning the ditch. On each of these axles are two bearing arms 71 fixed to opposite sides of the frame and in these the axle is free to rotate. Boards 72 on the sides of the ditch may support the wheels so as to protect the edges of the ditch and keep the machine at a uniform height above the ditch surface. Collars 73 prevent the axles 70 from sliding laterally in the bearing arm. Because of the new position of the supporting wheels, they are driven in a slightly different manner. In the new position a sprocket 75 rigidly fixed on the forward axle 70 is driven from the sprocket 43 at the side of the gear box by a chain or link belt 76. The wheels on the driven axle are, of course, fixed thereon non-rotatably. The advantage of this machine is that it makes no board or wheel marks on the surface of the ditch and is certain to remain level as long as the sides of the ditch are even.

A machine for guniting ditches that are relatively wide and shallow instead of semicircular is shown in Figures 6, 7 and 8. While the basic features of this machine are the same as those of the machines already described, the detailed construction is quite different. As do the other machines, this machine comprises a frame 11, wheels 12, and a motor 13. There are four wheels in this construction, mounted in pairs on axles 80, which are carried in bearing arms 81 on the underside of the frame 11. The other parts of this machine are somewhat different from the corresponding parts of the machines of Figures 1 to 5.

On one end of the frame 11, is mounted a laterally extending I-beam 82, the ends of which are bent upwardly so as to parallel the side walls of the ditch to be coated. The nozzle carrying arm is in the form of a U-shaped member 83, that extends over the I-beam and is movably supported thereon by two rollers 84 and 85 mounted in openings 86 and 87 in the U-shaped member. Each of the rollers is freely rotatable on a short shaft 88 fastened to the U-shaped member. One roller 84 bears against the top of the I-beam while the second roller 85 bears against the side of the I-beam away from the body of the machine. On the side towards the machine the U-shaped member 83 is connected to a driving chain 90 which will be hereafter more particularly described and on the opposite side the member terminates in a horizontally extending forked section 91 receiving and supporting the nozzle 20 of a pneumatic mortar projector. As the machine operates, the U-shaped member and the nozzle are reciprocated or oscillated back and forth from one end to the other of the I-beam 82, thus applying the coating in laterally extending strips as before.

Bracing the I-beam 82 is a cross beam 93 extending between the ends of the I-beam and connected to the frame 11, by angular supporting members 94. At each end of the I-beam is a rearwardly extending, forked bearing member 95, holding on a short shaft 96 a pulley 97 around which the driving chain 90 extends. Opposite the bends in the I-beam four pulleys 98 are provided to cause the chain to follow the contour of the I-beam. These pulleys are suitably journalled in brackets on the frame 11. No special means are provided in this machine to carry the water and material tubes leading to the nozzle but suitable means may be arranged if it becomes necessary.

The driving connections in this latter type of machine are basically similar to those already described but differ considerably in detail. On the shaft 100 of the motor 13 is a V-belt pulley 101 free to rotate but adapted to be clutched to the shaft by a clutch 102 adjacent thereto. Connected to the pulley 101 by a V-belt 103 are two similar pulleys 104 and 105. One of these pulleys 104 is mounted rigidly on a shaft carried in suitable bearing members 107, below the frame and connected by bevel gears 108 to one of the axles 80 to drive the machine along the ditch.

The other pulley 105 is fixed to a shaft 110 of a gear box and reversing mechanisms 111 mounted on the frame 11 and serving to drive a shaft 112 extending therefrom, first in one direction and then in the other, changing the direction at predetermined intervals. On the shaft 112 is a pulley 113 freely rotatable but connected thereto through a clutch 114. A belt 115 connects the pulley 113 to a horizontal pulley 116 on a stud shaft 117 supported from the frame. Adjacent the pulley and fixed thereto for rotation therewith is a sprocket 118 meshing with and driving the driving chain 90 that moves the nozzle carrying arm.

It will be apparent from a consideration of the machines described that others involving the same principles but with structural differences may be designed to produce similar coatings in a similar manner. The coating itself is essentially different because of its varying thickness and the homogeneity resulting from its uniform systematic application. Likewise, the method of coating is different from those previously in use since it provides for the application of the coating in even, uniformly spaced strips which make an unusually good covering with the least possible labor and material.

Among the structural refinements that may be provided in the new machines may be mentioned the provision of shields to protect the machine and its operation against wind and of trowelling devices oscillated with the projector nozzle to smooth away the last bit of roughness from the surface of the passage.

This application is a division of application Serial Number 722,585, filed by this same inventor on April 26, 1934, Patent No. 2,176,891, issued October 24, 1939.

I claim:

1. A machine for applying a coating to the inside of a passage that comprises a nozzle arranged to point at the side of the passage to be coated through which the coating material is propelled toward the side of the passage, means to move the nozzle circumferentially in a substantially vertical plane, said means moving the nozzle more slowly over the bottom of the passage than over the sides, and interconnected means to move the nozzle axially along the passage.

2. A machine for applying a coating to the inside of a ditch or tunnel that comprises a nozzle arranged to point at the side of the passage to be coated through which the coating material is propelled toward the side of the passage, means to move the nozzle circumferentially in a substantially vertical plane, said means moving the nozzle more slowly over one portion of the surface than over another and at a gradually changing speed therebetween, and interconnected means to move the nozzle along the ditch or tunnel.

3. A machine for applying a coating to ditches or tunnels that comprises a frame, means to movably support the frame in the ditch or tunnel, a gun having a nozzle for projecting coating material against the surface of the ditch or tunnel, means supporting said gun on the frame for rotation in a substantially vertical plane with said nozzle directed against said surface, driving means for oscillating said gun, said driving means oscillating said gun at slower speed through the middle portion of each oscillation than near the ends thereof, and interconnected means for moving the machine axially of the ditch or tunnel.

4. A machine for applying a coating to ditches or tunnels that comprises a frame, means to movably support the frame in the ditch or tunnel, a gun having a nozzle for projecting coating material against the surface of the ditch or tunnel, means supporting said gun on the frame for rotation in a substantially vertical plane with said nozzle directed against said surface, cam driving means for oscillating said gun, said driving means oscillating said gun at slower speed through the middle portion of each oscillation than near the ends thereof, and interconnected means for moving the machine axially of the ditch or tunnel.

JOHN M. CROM.